(12) United States Patent
Berkovitch et al.

(10) Patent No.: US 8,209,125 B2
(45) Date of Patent: Jun. 26, 2012

(54) METHOD FOR IDENTIFYING AND ANALYZING FAULTS/FRACTURES USING REFLECTED AND DIFFRACTED WAVES

(75) Inventors: Alex Berkovitch, Barkan (IL); Nathan Scharff, Modiin (IL); Igor Belfer, Bat Yam (IL)

(73) Assignee: Geomage (2003) Ltd., Modiin (IL)

( * ) Notice: Subject to any disclaimer, the term of this patent is extended or adjusted under 35 U.S.C. 154(b) by 307 days.

(21) Appl. No.: 12/526,630

(22) PCT Filed: Mar. 12, 2007

(86) PCT No.: PCT/IL2007/000312
§ 371 (c)(1), (2), (4) Date: Aug. 11, 2009

(87) PCT Pub. No.: WO2008/111037
PCT Pub. Date: Sep. 18, 2008

(65) Prior Publication Data
US 2010/0131205 A1    May 27, 2010

(51) Int. Cl.
*G01V 7/00* (2006.01)
*G01V 1/00* (2006.01)
*G01V 1/28* (2006.01)
(52) U.S. Cl. .................. 702/14; 702/2; 702/16; 367/14
(58) Field of Classification Search ............... 702/2, 14, 702/16; 367/14
See application file for complete search history.

(56) References Cited

U.S. PATENT DOCUMENTS

| | | |
|---|---|---|
| 4,760,563 A | 7/1988 | Beylkin |
| 4,878,205 A | 10/1989 | Gelshinsky |
| 4,935,905 A | 6/1990 | Gassaway |
| 5,103,429 A | 4/1992 | Gelshinsky |
| 5,331,604 A | 7/1994 | Chang et al. |
| 5,563,949 A | 10/1996 | Bahorich et al. |
| 5,724,309 A | 3/1998 | Higgs et al. |
| 5,831,935 A | 11/1998 | Luo et al. |
| 5,892,732 A | 4/1999 | Gersztenkorn |
| 5,920,828 A | 7/1999 | Norris et al. |

(Continued)

FOREIGN PATENT DOCUMENTS

EP  0619887 B1  1/2000

(Continued)

OTHER PUBLICATIONS

International Application PCT/IL2008/001147 Search Report dated Feb. 9, 2009.

(Continued)

*Primary Examiner* — Janet Suglo
(74) *Attorney, Agent, or Firm* — D. Kligler I.P. Services Ltd.

(57) ABSTRACT

A method for fault and fracture identification based on seismic data representing a geological section using dispersion properties of reflected and diffracted waves. The method includes scanning N parameters associated with the seismic data. The array includes the coordinate axes of the angle of emergence ($\beta$), the radius of curvature of the wave front (R) and either time or depth samples. The method also includes processing the N parameters, generating a new image having a cross-sectional shape associated with one of the reflected and diffracted waves, calculating parameters DS and LS, evaluating DS for the case of fracture characterization, and comparing, for the case of fault identification, parameter LS with a threshold value defining the type of wave as one of the reflected and diffracted wave, the cross-sectional shape being substantially circular for the reflected wave, and being elliptical for the diffracted wave.

15 Claims, 8 Drawing Sheets

U.S. PATENT DOCUMENTS

| | | | |
|---|---|---|---|
| 5,987,388 | A | 11/1999 | Crawford et al. |
| 6,018,498 | A | 1/2000 | Neff et al. |
| 6,263,284 | B1 | 7/2001 | Crider et al. |
| 6,636,809 | B1 | 10/2003 | Herrmann |
| 6,832,161 | B1 | 12/2004 | Moore |
| 6,989,841 | B2 | 1/2006 | Docherty |
| 7,069,149 | B2 | 6/2006 | Goff et al. |
| 7,085,195 | B2 | 8/2006 | Taner et al. |
| 2003/0018436 | A1 | 1/2003 | Stark |
| 2003/0220744 | A1 | 11/2003 | Schonewille |
| 2004/0049349 | A1 | 3/2004 | Wood |
| 2005/0222774 | A1 | 10/2005 | Dulac et al. |
| 2006/0155476 | A1 | 7/2006 | Abma |
| 2006/0155477 | A1 | 7/2006 | Matson et al. |
| 2007/0131411 | A1 | 6/2007 | Vinegar et al. |
| 2009/0067287 | A1 | 3/2009 | Berkovitch et al. |

FOREIGN PATENT DOCUMENTS

| | | |
|---|---|---|
| EP | 1563324 B1 | 8/2006 |
| WO | 2008111037 A2 | 9/2008 |
| WO | 2009034567 A2 | 3/2009 |

OTHER PUBLICATIONS

U.S. Appl. No. 11/900,243 Official Action dated Mar. 18, 2009.

Chira Oliva et al., "2-D ZO CRS Stack by Considering an Acquisition Line with Smooth Topography", Revista Brasiliera de Geofisica 23 (1), pp. 15-25, Sociedade Brasiliera de Geophysica, 2005.

Hertweck et al., "Data Stacking Beyond CMP", The Leading Edge, pp. 818-827, Jul. 2007.

Rupert et al., "The block move sum normal moveout correction", Geophysics, vol. 40, No. 1, pp. 17-24, Society of Exploration Geophysicists, Feb. 1975.

Yilmaz,O., "The Radon Transform", pp. 938-948, Seismic Data Analysis, Society of Exploration Geophysics, 1987.

Eric De Bazelaire, "Normal moveout revisited: Inhomogeneous media and curved interfaces", Geophysics, vol. 53, No. 2, No. 2, pp. 143-157, Society of Exploration Geophysicists, Feb. 1988.

Yilmaz, 0., "Velocity-stack processing", Geophysical prospecting, edition 37, pp. 351-382, 1989.

Byun et al., "Anisotropic velocity analysis for lithology discrimination", Geophysics, vol. 54, No. 12, pp. 1564-1574, Society of Exploration Geophysicists, Dec. 1989.

Gidlow et al., "Preserving far offset seismic data using non-hyperbolic moveout correction", Expanded Abstracts of 60th Annual International Meeting of Society of Exploration Geophysicists, pp. 1726-1729, San Francisco, USA, 1990.

Tsvankin et al., "Non-hyperbolic reflection moveout in anisotropic media", Geophysics, vol. 59, No. 8, pp. 1290-1304, Society of Exploration Geophysicists, Aug. 1994.

Shatilo et al., "Constant normal-moveout (CNMO) correction. A technique and test results", Geophysics Prospecting, vol. 48, pp. 473-388, European Association of Geoscientists & Engineers, 2000.

Hicks, G.J., "Removing NMO stretch using the radon and fourier-radon transforms", EAGE 63rd Conference & Technical Exhibition, A18, Amsterdam, The Netherlands, Jun. 11-15, 2001.

Berkovitch et al., Basic formula for multifocusing stack, EAEG 56th Meeting & Technical Exhibition, Vienna, Austria, Jun. 6-10, 1994.

Berkovitch, A., "The multifocusing method for homeomorphic imaging and stacking seismic data", Doctoral Thesis, Tel Aviv University, Oct. 1995.

Treitel et al., "Plane-Wave Decomposition of Seismograms", Geophysics, vol. 47, No. 10, pp. 1375-1401, Society of Exploration Geophysicists, Oct. 1982.

Thorson et al., "Velocity-Stack and Slant-Stack Stochastic Inversion", Geophysics, vol. 50, No. 12, pp. 2727-2741, Society of Exploration Geophysicists, Dec. 1985.

Foster et al., "Suppression of Multiple Reflections using the Radon Transform", Geophysics, vol. 57, No. 3, pp. 386-395, Society of Exploration Geophysicists, Mar. 1992.

Mitchell et al., "Efficient Tau-P Hyperbolic Velocity Filtering", Geophysics, vol. 55, No. 5, pp. 619-625, Society of Exploration Geophysicists, May 1990.

Hampson, Dan, "Inverse Velocity Stacking for Multiple Elimination", Journal of the Canadian Society of Exploration Geophysicists, vol. 22, No. 1, pp. 44-55, Dec. 1986.

Beylkin, Gregory, "Discrete Radon Transform", IEEE Transactions on Acoustics, Speech and Signal Processing, vol. ASSP-35, No. 2, pp. 162-172, Feb. 1987.

Trad et al., Accurate Interpolation with High-Resolution Time-Variant Radon Transforms, Geophysics, vol. 67, No. 2, pp. 644-656, Society of Exploration Geophysicists, Mar.-Apr. 2002.

Fomel, Sergey, "Least-Square Inversion with Inexact Adjoins. Method of Conjugate Directions: A Tutorial", Stanford Exploration Project (SEP) report SEP92, pp. 13-25, Nov. 9, 2000.

Hugonnet et al., "High Resolution Radon: a Review", IM2, EAGE 63rd Conference and Technical Exhibition, Amsterdam, The Netherlands, Jun. 11-15, 2001.

Thamban Nair et al., "The Trade-off Between Regularity and Stability in Tikhonov Regularization", Mathematics and Computation, vol. 66, No. 217, pp. 193-206, American Mathematical Society, Jan. 1997.

Landa et al., "Seismic monitoring of diffracted images for detection of local heterogeneities", Geophysics, vol. 63, No. 3m pp. 1093-1100, Society of Exploration Geophysicists, May-Jun. 1998.

International Application PCT/IL2009/000201 Search Report dated May 14, 2009.

International Application PCT/IL2007/000312 Search Report dated Sep. 10, 2008.

Taner et al., "Separation and imaging of seismic diffraction using plane-wave decomposition", pp. 2401-2405, International Exposition and 66th Annual Meeting, Society of Exploration Geophysicists, New Orleans, USA, Oct. 1-6, 2006.

U.S. Appl. No. 12/080,218 Official Action dated Aug. 29, 2011.

U.S. Appl. No. 12/608,009 Official Action dated Sep. 13, 2011.

Russian Patent Application # 2010112964 Official Action dated Oct. 6, 2011.

Russian Patent Application # 2010135895 Official Action dated Oct. 6, 2011.

METHOD FOR IDENTIFYING AND ANALYZING FAULTS/FRACTURES USING REFLECTED AND DIFFRACTED WAVES

FIELD OF THE INVENTION

The present invention relates generally to computer aided exploration for hydrocarbons using seismic data, and more particularly, the invention relates to a computer implemented method for identifying, imaging and analysis of faults/fractures from seismic data using dispersion properties of reflected and diffracted waves both for 2-D and 3-D seismic data.

BACKGROUND OF THE INVENTION

The prediction of faulting and fracturing is very important in oil and gas exploration and production. The reservoirs in which hydrocarbons have been located include clastics (sandstones etc.) and carbonates (limestones etc). Faulting has general value for both types of rocks, but distribution of fracture in carbonates is a particular target of the development of oil and gas fields.

Traditional techniques use the time, amplitude and velocity attributes of reflected waves to recognize stratigraphic features and sudden changes of attributes interpreted as faulting. The methods which use correlation coefficients between adjacent seismic traces, derivative difference, amplitude difference, eigenvalues and other statistical parameters derived from adjacent seismic traces require time consuming, manual interpretation of the geologic faults and fractures.

Automatic methods of fault identification and fracture evaluation use only reflections and suffer from "false alarms" connected with correlation losses specified by influence of the upper part of the subsurface. Methods exist for separation of the wave field into diffracted and reflected waves, dependent on artifacts specified by Radon-transform and on exactness of velocity analysis. Diffracted images are performed without taking into account the angle of incidence for different types of waves.

Traditionally, subsurface formations are analyzed using reflection data that is processed into image interfaces with impedance contrast, but seismic data contain two types of coherent events generated from subsurface discontinuities: reflections and diffractions. Diffractions are generated by local discontinuities, which act as a point source, whereas reflections are generated by an extensive reflection boundary. Faulting of stratigraphic subterranean formations creates hydrocarbon traps and flow channels. Therefore, accurate identification of the faults is essential to the interpretation of seismic data.

In many geological basins the detailed identification of faults and degree of fracturing can be extremely useful in seismic reservoir characterization. Changes in the elastic properties of subsurface rocks appear as seismic reflections. Such changes in the properties of the rocks typically occur at boundaries between geologic formations, at fractures and at faults.

Faults may be detected by looking at vertical displacement of seismic reflectors in 2-D and 3-D data. The continuity of seismic reflectors in seismic amplitude data may be quantified by computing the correlation coefficient between adjacent seismic traces over a movable vertical window (Bahorich et al, U.S. Pat. No. 5,563,949), derivative difference (Luo, et al., U.S. Pat. No. 5,724,309), amplitude difference (Luo et al., U.S. Pat. No. 5,831,935) and eigenvalues derived from adjacent seismic traces (Gersztenkorn, et al, U.S. Pat. No. 5,892,732). However, each of these methodologies requires the manual interpretation of the geologic faults, which is time consuming.

Some methods have been proposed for automatic picking of faults. Crawford, et al, in U.S. Pat. No. 5,987,388 describes such a method, which includes processing of individual lateral slices of the 3-D seismic volume, wherein for each lateral slice, stripe artifacts are eliminated by adjusting pixel values to account for lines that are unduly bright or dim. Detection of lines in the enhanced lateral slice is then performed by summing pixel intensities over a window at varying directions.

Neff, et al, in U.S. Pat. No. 6,018,498, uses test planes, which are mathematically inserted into the seismic data volume to approximate dip and azimuth of a potential fault plane surface. Goff, et al, in U.S. Pat. No. 7,069,149, describes a method for extracting geologic faults from seismic data, which includes calculating a minimum path value for each voxel of an attribute cube, extracting a fault network skeleton by utilizing the minimum path values corresponding to voxels, flood filling the fault network to identify a plurality of fault segments, labeling the fault segments and creating a vector description of the fault network skeleton.

In all these methods only reflected waves are used. The reflected wave field may be aggravated by local places of noise and zones of correlation losses specified by the influence of the upper part of the subsurface. These features frequently have properties of a fault and look like a fault. This may lead to identification of false disturbances interpreted as faults. Therefore, it is necessary to separate independent wave types, namely diffracted and reflected waves, in order to analyze them independently.

A method for separation of diffraction and reflection waves on seismic data is proposed by Taner, et al, "Separation and imaging of seismic diffraction using plane-wave decomposition," SEG/New Orleans 2006 Annual Meeting. The plane wave decomposition of split spread common shot records is used in this method. Plane-wave destruction filtering is applied with subsequent velocity analysis and a prestack migration procedure. Deficiencies of this method consist in its dependence on artifacts connected with a Radon-transform and exactness of velocity analysis.

A method for detection of diffracted waves by concentrating the signal amplitudes from diffracting points on the seismic section is proposed by Landa, et al, "Seismic monitoring of diffracted images for detection of local heterogeneities," Geophysics, 63, p. 1093. The difference in properties of the reflected and diffracted waves connected with the angle of incidence of the wave to the surface is not considered in this method.

In general, interference, multiple reflections or artifacts introduce regular and irregular noise, which sometimes renders the image of the subsurface difficult to interpret. CMP stacking is used for suppression of noise and multiples, but it does not give the desired result in the case of small folding. A multifocusing method (Berkovitch, et al, "Basic formulae for multifocusing stack," 56th Mtg. Eur. Assoc. Expl Geophys., 1994, Extended Abstracts, Session, p. 140) makes it possible to increase the signal to noise ratio in cases of small folding. The multifocusing (MF) method is based on the Homeomorphic imaging method, by Gelchinsky, described in U.S. Pat. No. 5,103,429. MF consists of stacking, which involves all available traces around the central trace.

The coherency of stacking of useful events is achieved by an adaptive moveout correction procedure based on the parameterization of wave fronts by oblique spherical arcs and by dynamic ray tracing. The MF stack represents the optimal stacked values, corresponding to the optimal parameters (β—angle of incidence of the wave front, R— the radius of curvature of the wave front, connected with velocity in the media and R*- the radius of the circle arc, which approximates a segment of the reflector), and is close to an accurate zero-offset section.

The exact knowledge of all three parameters allows calculation of the exact NMO corrections within the base of the analysis. For definition of exact values of these parameters the scanning of them with a constant increment is performed with calculation of the coherency measure. In particular, scanning the parameters β and R leads to the formation of the cube $S(β,R,t)$, where t is the time, filled with semblance values, for each central trace of the image. The maximum of the coherency measure corresponds to optimal values of β, R and R* on each time sample.

A core and unique characteristic of MF is its ability to pick out the diffracting objects by focusing the diffracted waves.

Thus it would be desirable to provide an improved method for analyzing the diffraction and reflection of waves derived from seismic data.

REFERENCES

U.S. Pat. No. 5,103,429 April 1992 Gelchinsky
U.S. Pat. No. 5,563,949 October 1996 Bahorich, et al.
U.S. Pat. No. 5,724,309 March 1998 Higgs, et al.
U.S. Pat. No. 5,831,935 November 1998 Luo, et al.
U.S. Pat. No. 5,987,388 November 1999 Crawford, et al.
U.S. Pat. No. 5,892,732 April 1999 Gersztenkorn, et al.
U.S. Pat. No. 6,018,498 January 2000 Neff, et al.
U.S. Pat. No. 7,069,149 June 2006 Goff, et al.
Landa et al, "Seismic monitoring of diffracted images for detection of local heterogeneities" Geophysics, 63, 691-714.
Taner et al, "Separation and imaging of seismic diffractions using plane-wave decomposition" Expanded Abstracts of SEG 60 Annual Meeting, October 2006, New Orleans.

SUMMARY OF THE INVENTION

Accordingly, it is a principal object of the present invention to provide a method for separating the diffraction and reflection of seismic waves using two parameters of the wave selection: β and R, and by using transformations obtaining a new image for each pixel (image point), which accumulates the energy of the diffracted and reflected waves.

It is a further principal object of the present invention to isolate the point of reflection or diffraction so that the geometries of the reflected wave and the diffracted wave will be distinguished.

A method is disclosed for fault and fracture identification, analysis and visualization for exploration of resources based on seismic data representing a geological section using dispersion properties of reflected and diffracted waves, comprising scanning N parameters associated with the seismic data for each of a plurality positions within a seismic section, wherein said N parameters define an N-dimensional array corresponding to each of said positions in said seismic section, said array comprising at least the coordinate axes of the angle of emergence (β), the radius of curvature of the wave front (R) and one of time and depth samples and processing said N parameters of each of said plurality of said N-dimensional arrays. Processing comprises deriving therefrom a new N-dimensional array having said same N parameters, generating a new image having a cross-sectional shape associated with one of said reflected and diffracted waves, calculating parameters DS and LS, wherein DS represents fracture characterization, and LS represents fault identification, evaluating DS, for the case of fracture characterization, and comparing, for the case of fault identification, parameter LS with a threshold value defining the type of wave as one of said reflected and diffracted wave, said cross-sectional shape being substantially circular for said reflected wave, and being elliptical for said diffracted wave, such that a plurality of said cross-sectional shapes represents a geological fault formation.

The present invention relates to the field of computer aided exploration for hydrocarbons using seismic multifold data processed using the procedure of multifocusing scanning of the main parameters of the wave field. These parameters are angle of incidence of the wave front and its radius of curvature connected with velocity in the subsurface. Such scanning allows determination of the cube of data for each central trace of the seismic stack $S(β,R,t)$, and gives an opportunity for the separation of the wave field into reflection and diffraction components.

Accumulation of diffracted energy in the resulting cube $S(β,R,t_0)$ by extraction of semblance measure, calculated in multifocusing, according to arrivals of the diffracted wave, allows identifying faults, fractures, channels and other geophysical features. Decision-making about the presence of a fault/fracture is a result of analysis of the semblance image plane with coordinates β and R.

The method of the present invention includes the scanning of two parameters of the wave field, namely β—angle of incidence and R—radius of curvature of the wave front, and calculating the coherency measure for each tested pair of the parameters. As a result, for each position of the central trace of the time section, semblance values are calculated and the cube is filled. The axes of this cube are β, R and t (time). In the base of analysis, which covers positions of N traces, the new cube is calculated related to the central position of the base.

Each pixel of this new cube is formed from the pixels of initial cubes in accordance with the formula of diffracted wave arrivals. For each pixel of this new cube (image point) the amplitude, i.e., measure will depend on the wave mode. The pixels with the large amplitude for the diffracted wave will be lined up along the axis β, since this wave issues evenly from the image point in different directions. The reflected wave will be localized. As a result, there is a possibility for the quantitative evaluation of the semblance anomaly image at each time sample. The faults are separated as the sources of diffracted waves, and zones with a different fracture structure stand out against a background according to the pattern of the coherency measure.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
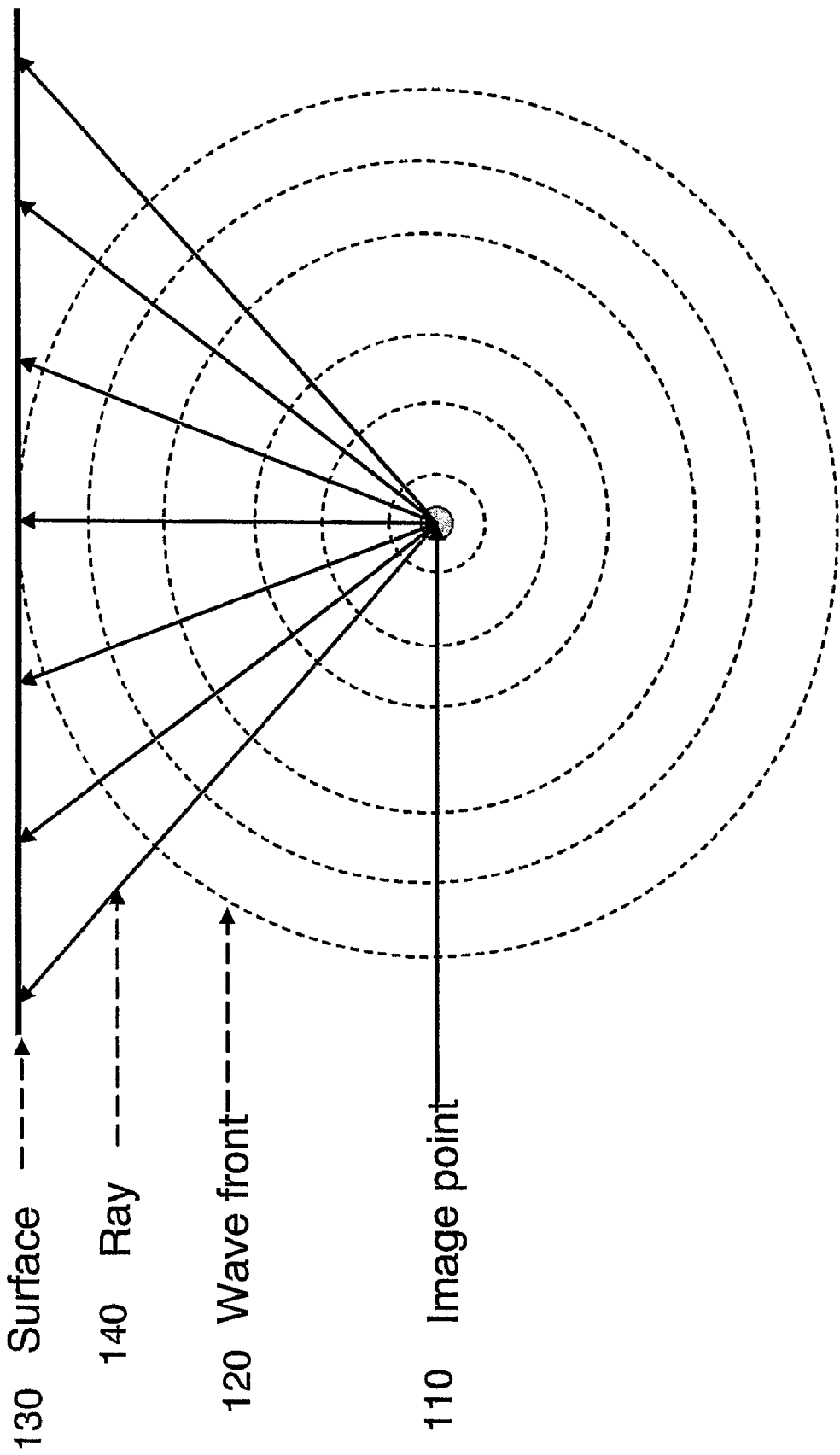
FIG. 1 is a diagrammatic representation of the diffracted wave spreading from the image point, constructed in accordance with the principles of the present invention.

Reference is now made to FIG. 1, showing a diagrammatic representation of the diffracted wave spreading from the image point, in accordance with the principles of the present invention. In FIG. 1, the diffracted wave, being extended from the image point 110 on the boundary, distributes energy evenly along the wave front 120 in the ideal case. Thus, the seismic receivers, located evenly on a certain base on the surface 130 above the source of the rays 140 of the diffracted wave, will register fluctuations from it with the approximately identical amplitude.

Figure 2:
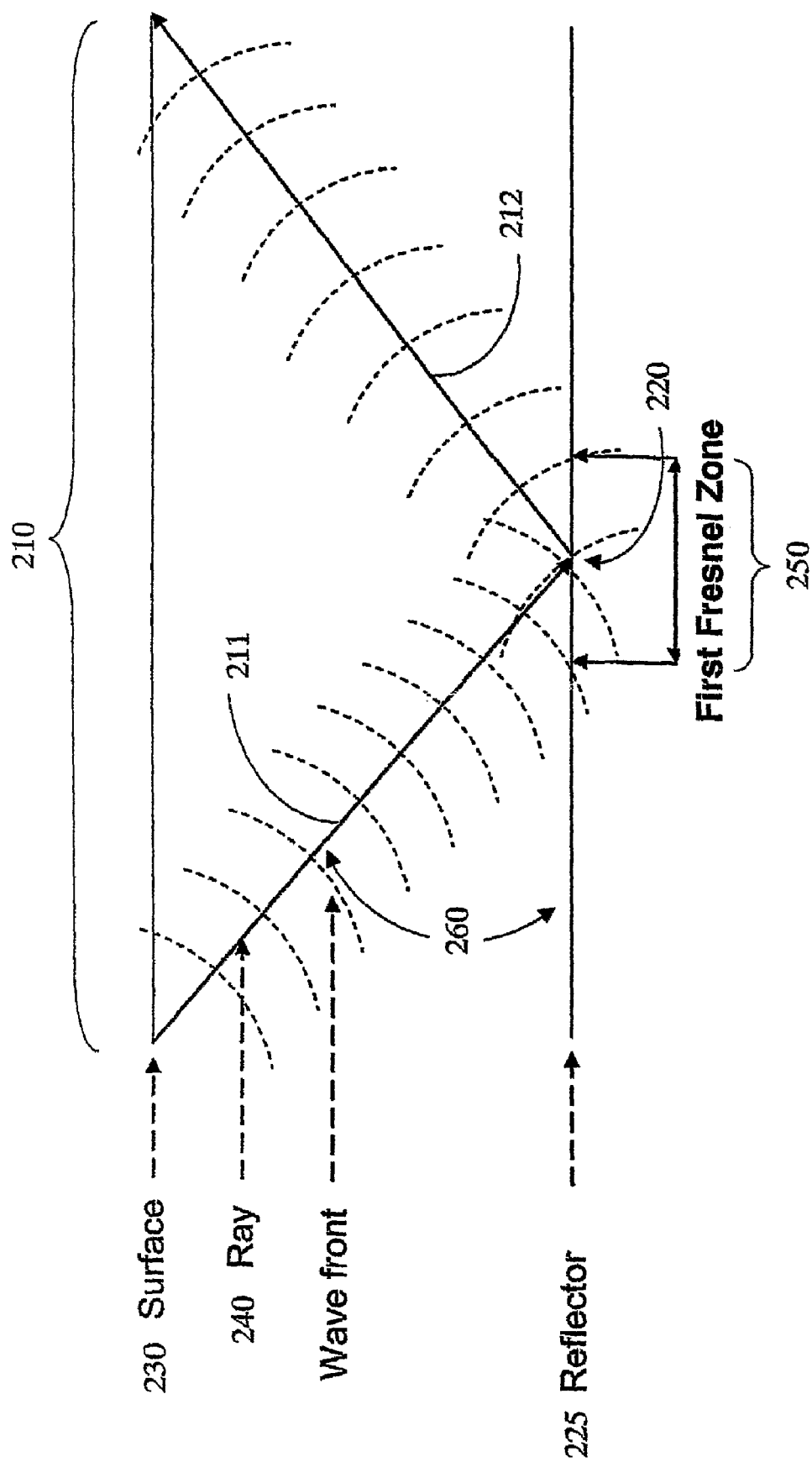
FIG. 2 is a diagrammatic representation of the reflected wave passing the image point, constructed in accordance with the principles of the present invention.

FIG. 2 is a diagrammatic representation of the wave distribution within the limits of the aperture 210, comprising an incident wave 211 and a reflected wave 212 after passing the image point 220, constructed in accordance with the principles of the present invention. Reflected wave 212, after being reflected from image point 220 of reflector 225, comes to the reflecting surface 230 and localizes energy along the ray 240. This is the region of reflection called the Fresnel zone 250. The region of emergence of the maximum energy varies with the horizontal position of reflecting surface 230, and depends only on the angle of incidence 260 of wave 210. It is known that faults and fractures in the subsurface are the sources of the diffracted waves, especially if there is displacement of layers along it.

The following are the steps of the present invention, which identify these disturbances:

In a first (1) step the scanning of two parameters (β—emergency angle and R—the radius of curvature of the wave front) is produced by the multifocusing method for each time sample of the cross-section. Arrivals of the wave are calculated with subsequent evaluation of the coherency measure for each pair of parameters $β_i$, $R_i$ of the i-th probe. Thus, the cube of data is calculated with the axes β, R and t, where t is time, which is filled with the values of the coherency measure S(β, R, t).

Any derivative of (β, R, t) parameters and parameters used to obtain (β, R, t) may be used for the subsequent analysis.

In the second step (2) the set of input cubes S(β, R, t) are evaluated. These cubes correspond to several adjacent central traces, as described with reference to FIG. 3 below.

Figure 3:
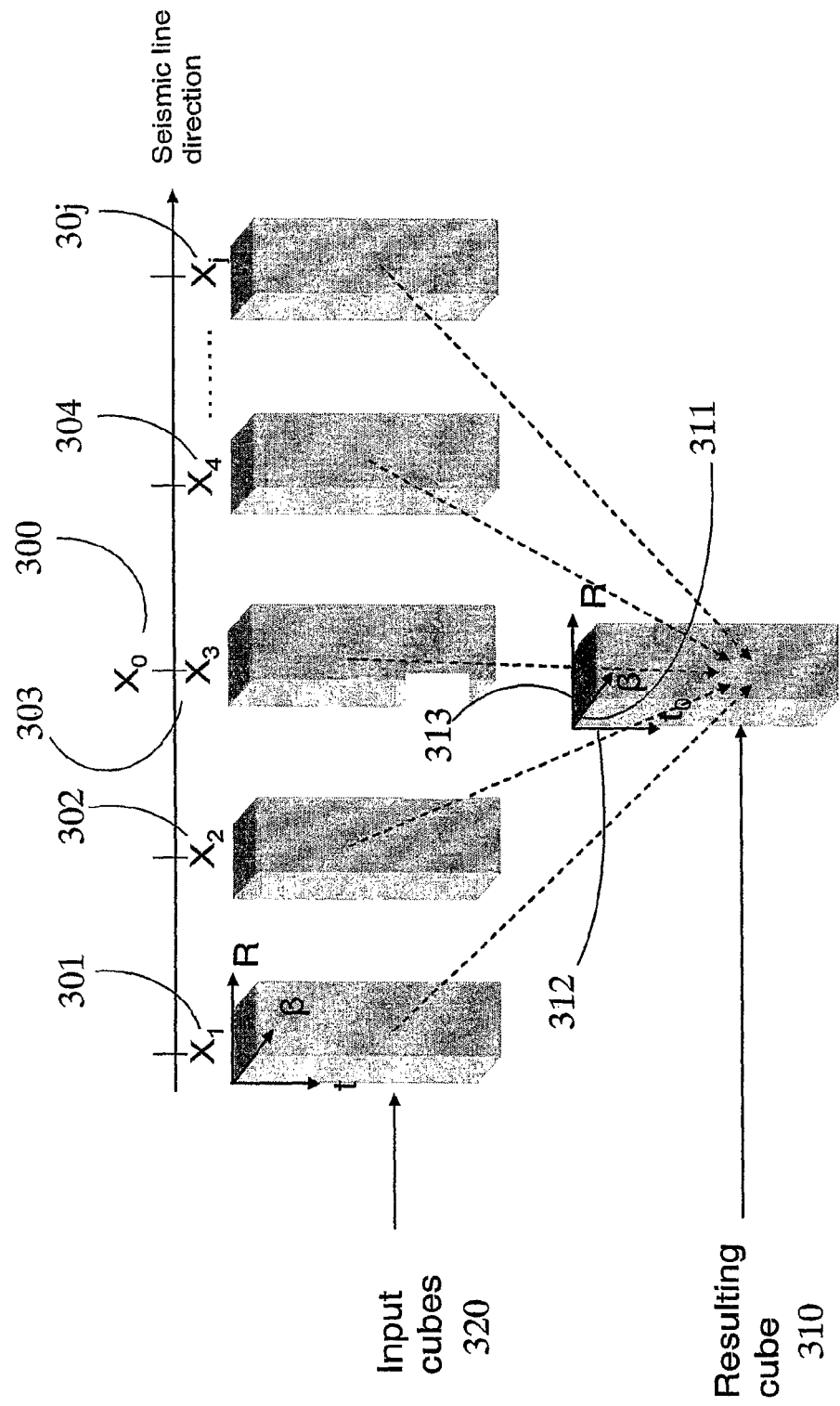
FIG. 3 is a graphical representation of conversion of semblance measure to the vertical time domain, constructed in accordance with the principles of the present invention.

FIG. 3 is a graphical representation of the conversion of semblance measure to the vertical time domain, in accordance with the principles of the present invention. The coordinate of the central cube 300 of the input set of cubes 320 is designated as $X_0$ and the coordinates of the adjacent cubes 301-30j are $X_j$.

Figure 4:
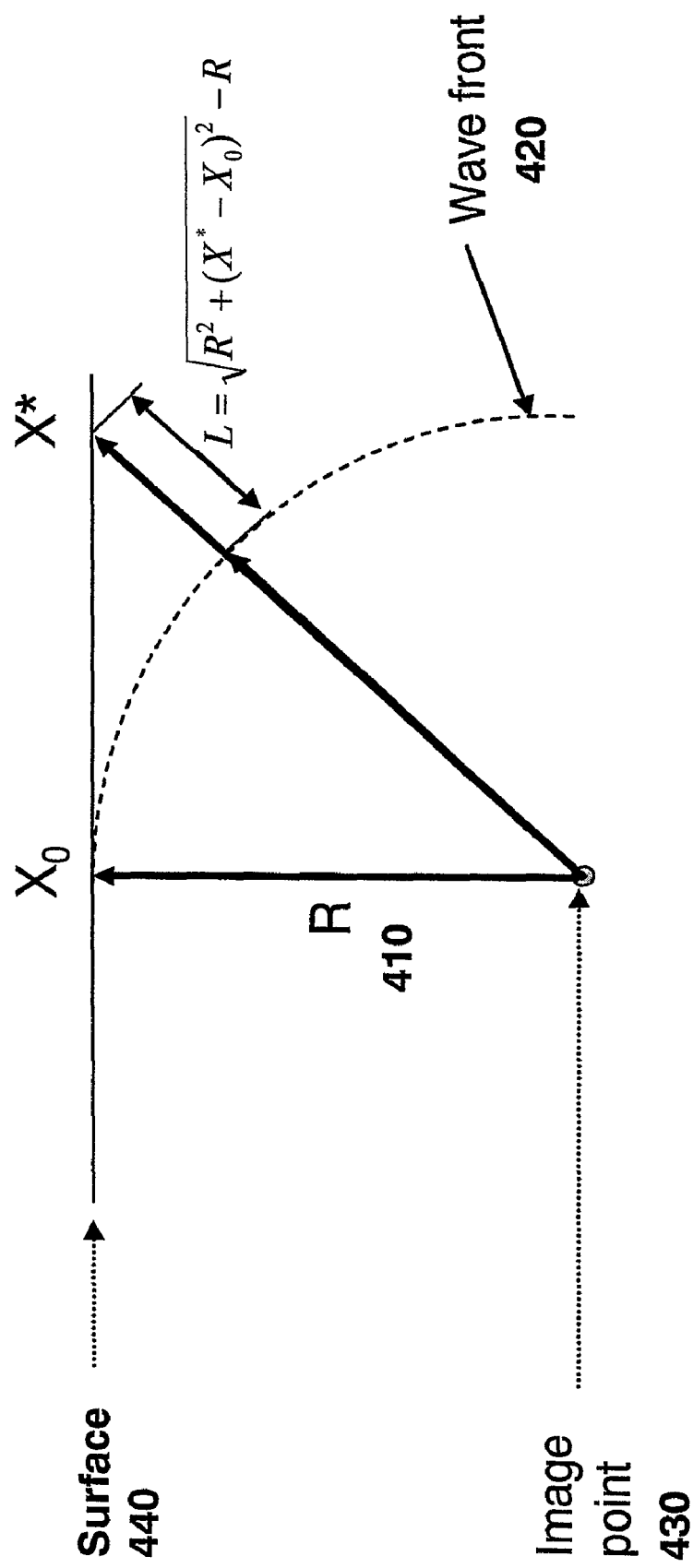
FIG. 4 is a graphical representation of diffracted wave rays, constructed in accordance with the principles of the invention.

In the third step (3) the resulting cube 310 of the data S(β, R, $t_0$) having coordinates β 311, R 312 and $t_0$ 313 is calculated for the purpose of conversion to the vertical time corresponding to the vertical ray. The coordinate along the profile of resulting cube 310 corresponds to the coordinate of central cube 300 of the set. The coordinate of each of the input cubes 320 for obtaining each pixel in S(β, R, $t_0$) is calculated as $$X^* = X_0 + R tg(β), (tg(β) = \text{tangent of } β)$$

and its time as $$t = t_0 + \frac{L}{V_0},$$

wherein, in accordance with FIG. 4, $$L = \sqrt{R^2 + (X^* - X_0)^2} - R$$

This formula may be replaced any other formula which approximates first arrivals of the diffracted wave.

FIG. 4 is a graphical representation of diffracted wave rays, in accordance with the principles of the invention. R is the radius 410 of the wave front 420. Radius 410 also determines the distance from the image point 430 to the surface 440. $V_0$ is the velocity in the upper part of the subsurface, $t_0$ is vertical time. Coordinate X* may be between or out of the coordinates of input cubes 320. Interpolation or extrapolation of semblance values is performed in this case.

In the fourth step (4) the parameters of the ellipsoid (the three main vectors), which approximates the "cloud" of coherency measures, are evaluated with the principal component method in a sliding window (equal approximately to the period of the main frequency) along the time axis of resulting cube 310 having data S(β, R, $t_0$). The two averages of the distribution dispersion of the coherency measure DS inside of the ellipsis and the measure of the oblongness of the ellipsis LS, are calculated in the plane of the first two principal components with formulas $$DS = E(S - ES),$$

where E is the average of distribution, and $$LS = \frac{T_2}{T_1},$$

where $T_1$ is the first eigenvalue (module of the first eigenvector) and $T_2$ is the second eigenvalue, with reference to FIG. 5 below.

Figure 5A:
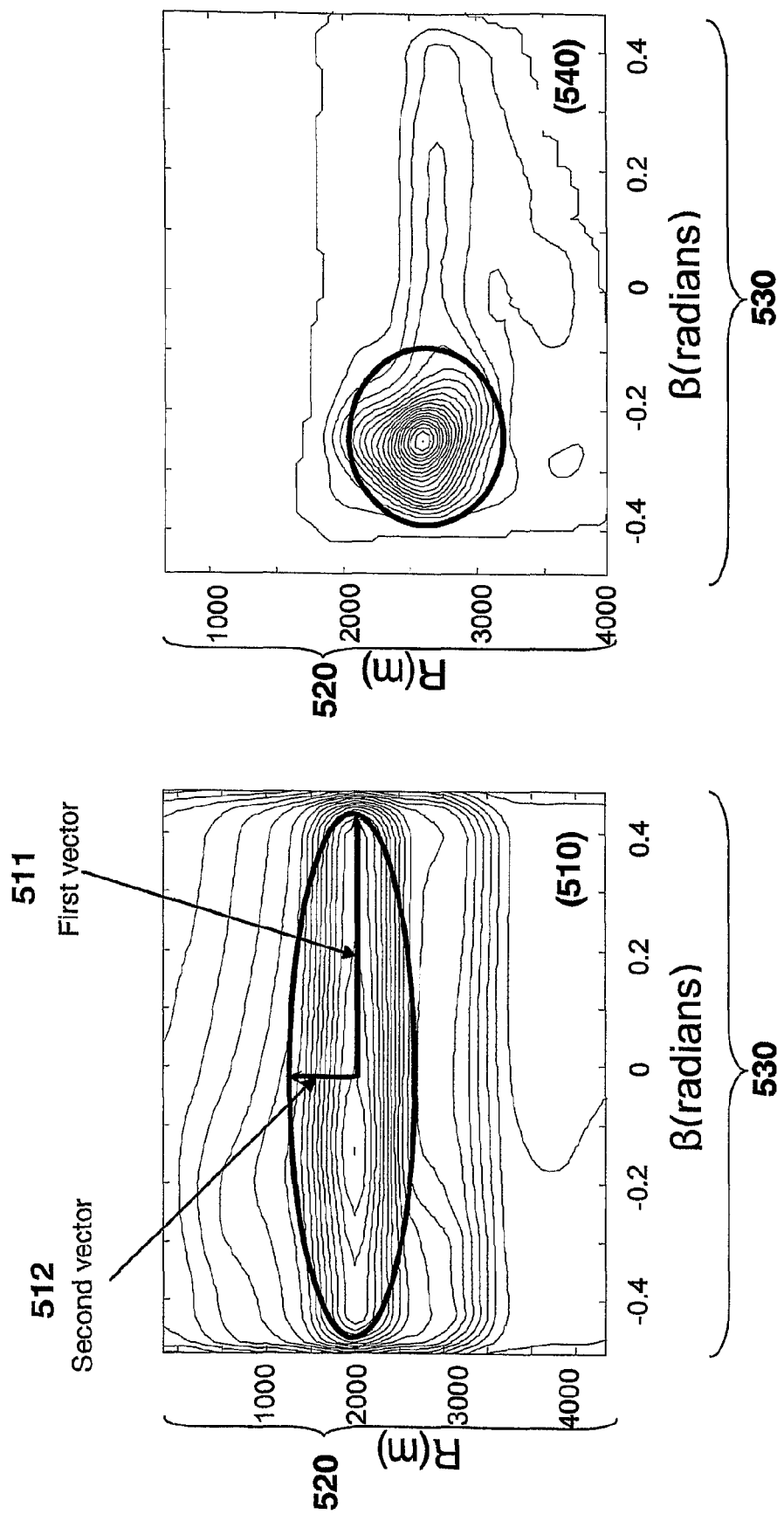
FIG. 5a is a graphical representation of the parameters distribution for the two types of waves, constructed in accordance with the principles of the invention.

FIG. 5a is a graphical representation of the parameter distribution for the two types of waves in matrices of covariation, constructed in accordance with the principles of the invention. The diffraction wave parameter distribution 510 shows a first eigen vector 511 and a second eigen vector 512 for radius R in meters 520 vs. angle β in radians 530. The reflection wave parameter distribution 540 is also shown for radius R in meters 520 vs. angle β in radians 530. The variations in line spacing of FIG. 5 represent a measure of coherency from dense to wide. Dense represents low coherency and wide represents high coherency.

Figure 5B:
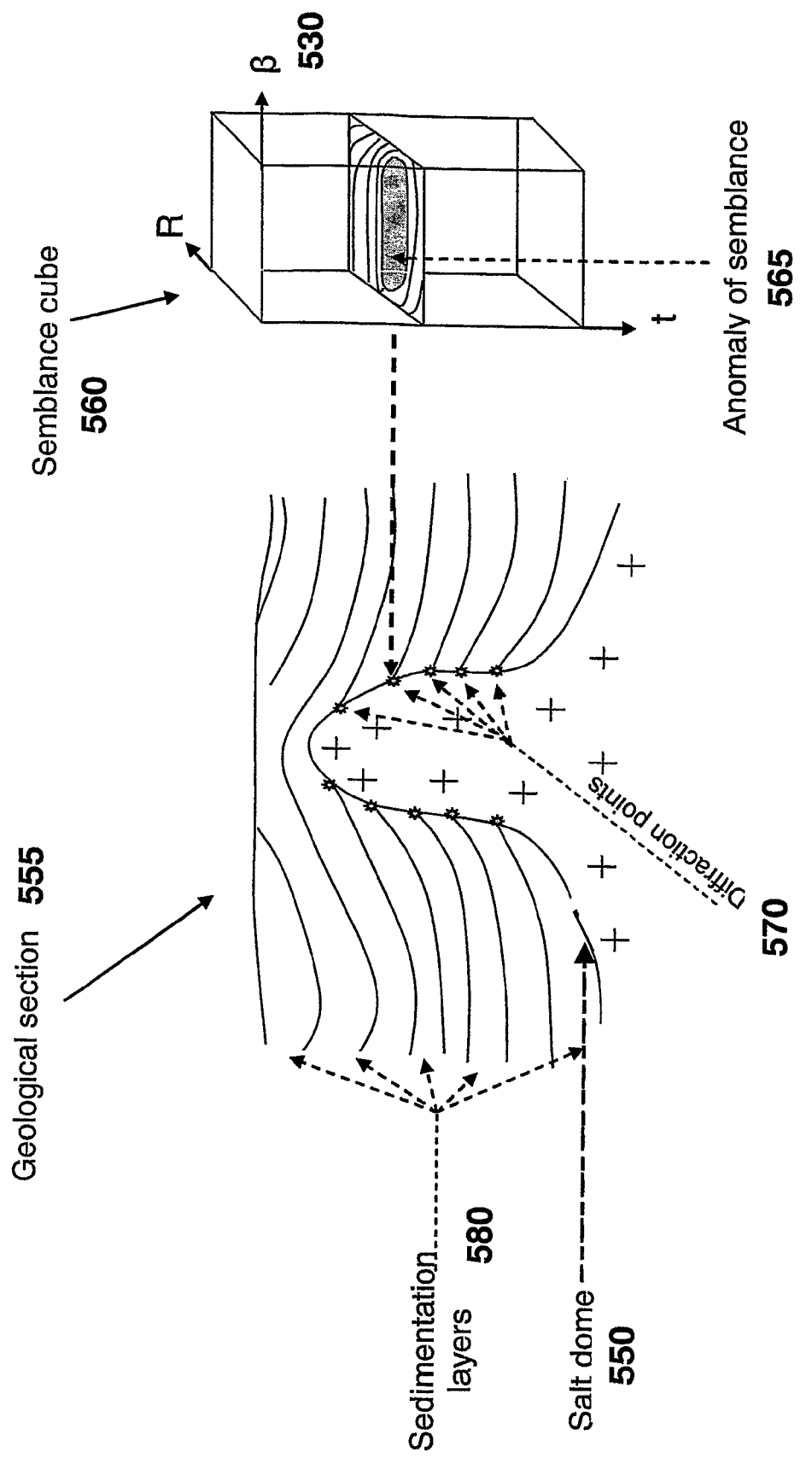
FIG. 5b is a graphical representation of an exemplary diffraction object, a salt dome, within a geological section in a semblance cube, exhibiting an oblong anomaly of semblance along the β axis.

FIG. 5b is a graphical representation of an exemplary diffraction object, a salt dome 550, within a geological section 555 represented by a semblance cube 560, exhibiting an oblong anomaly of semblance 565 along β axis 530. The diffraction points 570 are at the interface of salt dome 550 and the sedimentation layers 580 in geological section 555.

In the fifth step (5) parameter DS is represented as the measure of the roughness of boundaries, or as the measure of the fracturing of the species (an analogue of permeability), and parameter LS—as the measure for estimation of wave mode. If LS>$\overline{LS}$, where $\overline{LS}$ is the threshold value, then the wave is considered as diffracted, since its energy comes to the surface from different directions, in contrast to the reflected wave connected with the image point, which is recorded in the local region, determined by the angles of incidence and reflection.

In the sixth step (6) parameter DS may be used in evaluation of the collectors characteristics during reservoir characterization, while parameter LS may be used for evaluation of large and small tectonic disturbances in the earth for oil and gas exploration. The set consisting of two elements $B=\{\text{False, True}\}$ in a scale of the studied time section is visualized for this purpose. Assertion "False" corresponds to 0 (LS≤$\overline{LS}$), and assertion "True" is 1 (LS>$\overline{LS}$). Such an image will make it possible to reveal the fractures (or faults) as lengthy lines, which can be superimposed on traditional seismic time sections for the purpose of subsequent interpretation, with reference to FIG. 7 below as described below.

In the seventh step (7) the next new cube (block 300 in FIG. 3) is generated using the next input set of cubes 320. Thus, the procedure of new cube generation continues along a moving base (moving sets of input cubes along the seismic profile).

Figure 6:
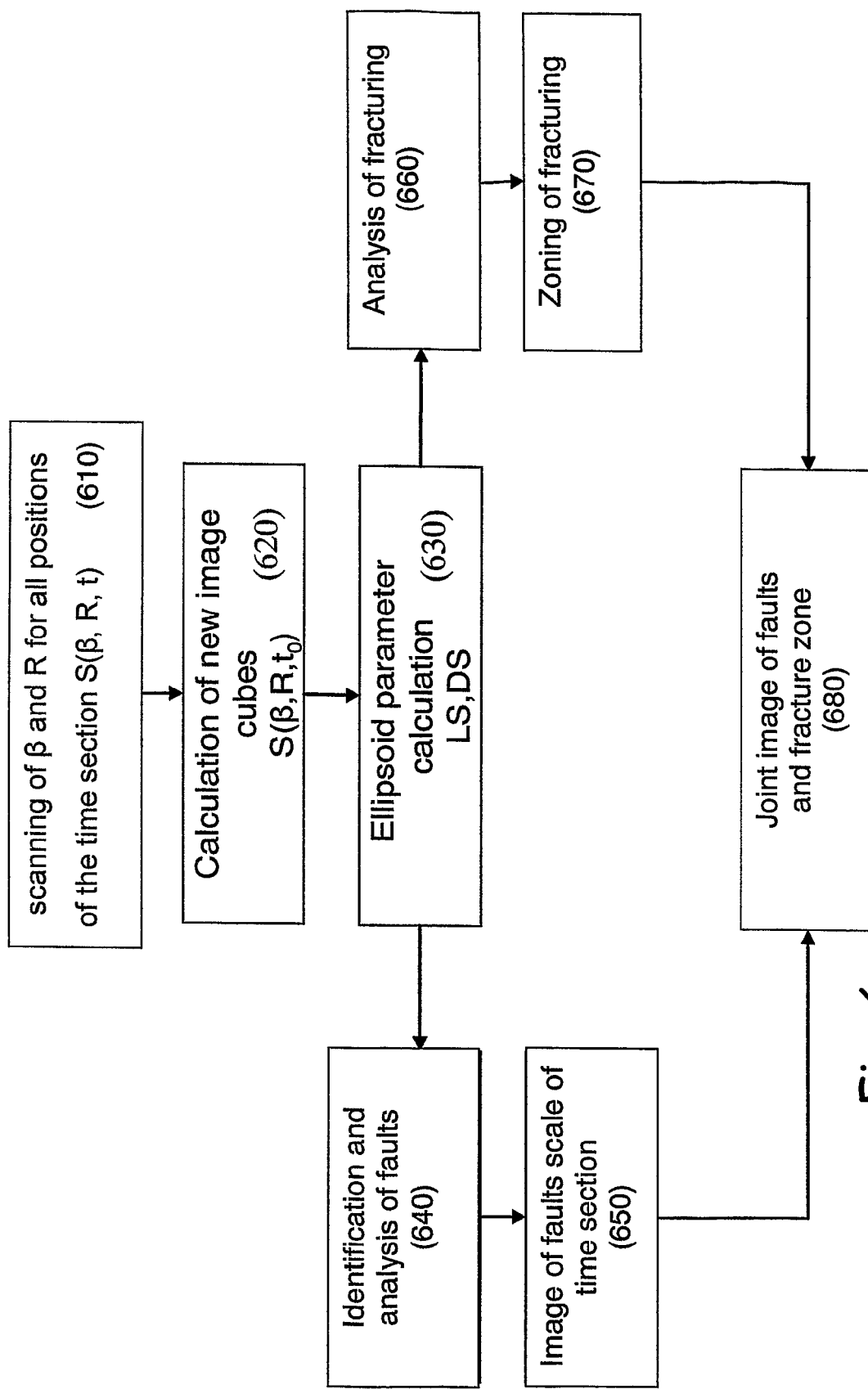
FIG. 6 is a flow chart for the fault and fracture identification, analysis and visualization for exploration and reservoir characterization, constructed in accordance with the principles of the present invention.

FIG. 6 is a flow chart of faulting identification, analysis and visualization for exploration, constructed in accordance with the principles of the present invention. The first step is the scanning of β and R for all positions of the time section S(β, R, t) 610 and then the new image cubes of S(β, R, $t_0$) are calculated 620. Then the ellipsoid parameter calculations of LS are made 630. Subsequently, faults are evaluated: faults are identified and analyzed 640 and an image is made of the faults scale of the time domain 650.

Figure 7:
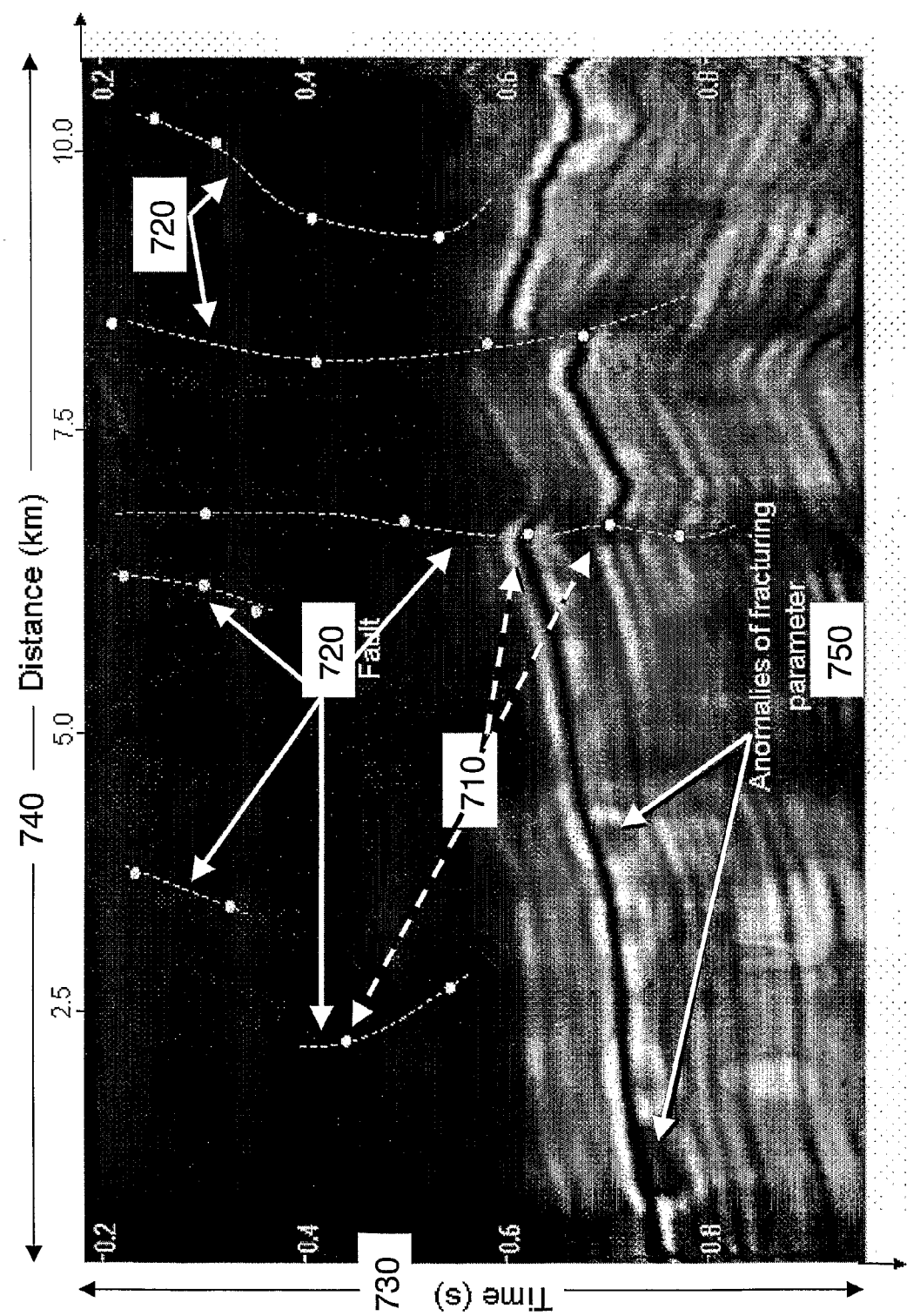
FIG. 7 is a schematic representation of the fault and fracturing determination result constructed in accordance with the principles of the present invention.

FIG. 7 is a schematic representation of the fault and fracturing determination result constructed in accordance with the principles of the present invention. The points of diffraction 710 are shown along the superimposed fault lines 720, for time 730 vs. distance 740. The anomalies of the fracturing parameter 750 are also shown Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method for processing seismic data, comprising:
   receiving, by a computer, a record of seismic waves measured at multiple locations due to reflection and diffraction of the seismic waves;
   computing, by the computer, for each of a plurality of positions within a seismic section,
   an N-dimensional array of data, wherein one of the dimensions corresponds to time and at least two of the dimensions correspond respectively to at least two wave front parameters, and the data in the array comprise values of a coherency measure, for specific corresponding time and wave front values; and
   determining whether the N-dimensional arrays of data of the different positions include data indicative of a diffractive wave coming from a single diffraction to a plurality of positions within the seismic section.

2. The method according to claim 1, and comprising evaluating geological fracturing by calculating a dispersion of the coherency measure.

3. The method according to claim 1, wherein the N-dimensional array is a cube having three dimensions.

4. The method according to claim 1, wherein the at least two of the wave front parameters comprise an angle of emergence and a radius of curvature of the seismic waves.

5. The method according to claim 1, wherein the coherence measure comprises a semblance.

6. The method of claim 1, wherein determining whether the N-dimensional arrays include data indicative of a diffractive wave comprises deriving from the N-dimensional arrays of data of the different positions, a new N-dimensional array, including at least three dimensions, according to a diffracted wave formula and determining whether the new array is indicative of a diffractive wave.

7. The method of claim 6, wherein determining whether the new array is indicative of a diffractive wave comprises evaluating shapes of equal coherency lines in cross-sections of the new array.

8. The method according to claim 7, wherein evaluating shapes of equal coherency lines comprises finding an ellipsoidal shape that is indicative of the diffraction of the seismic waves.

9. The method according to claim 8, comprising measuring an oblongness of the ellipsoidal distribution.

10. The method of claim 7, wherein evaluating shapes of equal coherency lines comprises finding a circular shape that is indicative of the reflection of the seismic waves.

11. The method of claim 6, wherein said new N-dimensional array is filled with new values of semblance measure as a result of reformation of said coherency measure for N scanned parameters.

12. The method of claim 11, further comprising calculating said new N-dimensional array related to the central position of the base, wherein the base of analysis covers positions of M traces.

13. The method of claim 6, wherein for each pixel of each said new N-dimensional array (image point), the amplitude measure depends on the wave mode.

14. The method of claim 13, wherein the pixels with the largest amplitude for the diffracted wave will be lined up along the axis 13 representing said parameter β, since this wave issues from said image point evenly in different directions.

15. The method of claim 1, wherein determining whether the N-dimensional arrays include data indicative of a diffractive wave comprises determining whether the N-dimensional arrays are indicative of waves coming from a single point evenly in different directions.

* * * * *